July 10, 1956
C. M. STAUFFER
2,753,901
PLANING CUTTER AND CUTTER-ARBOR ASSEMBLY
Filed Aug. 26, 1952
2 Sheets-Sheet 1
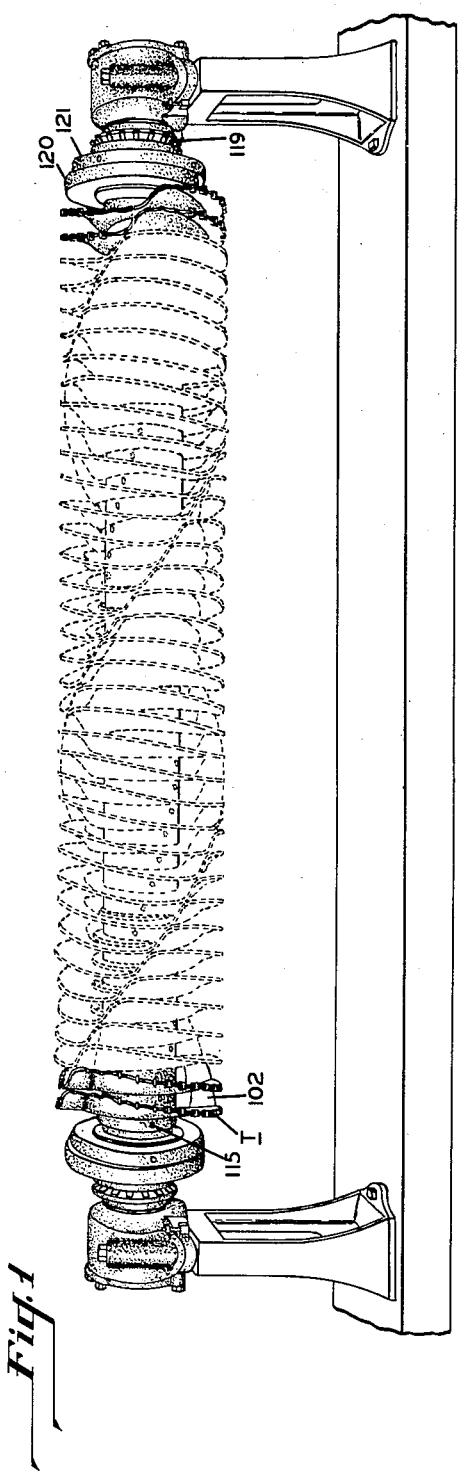
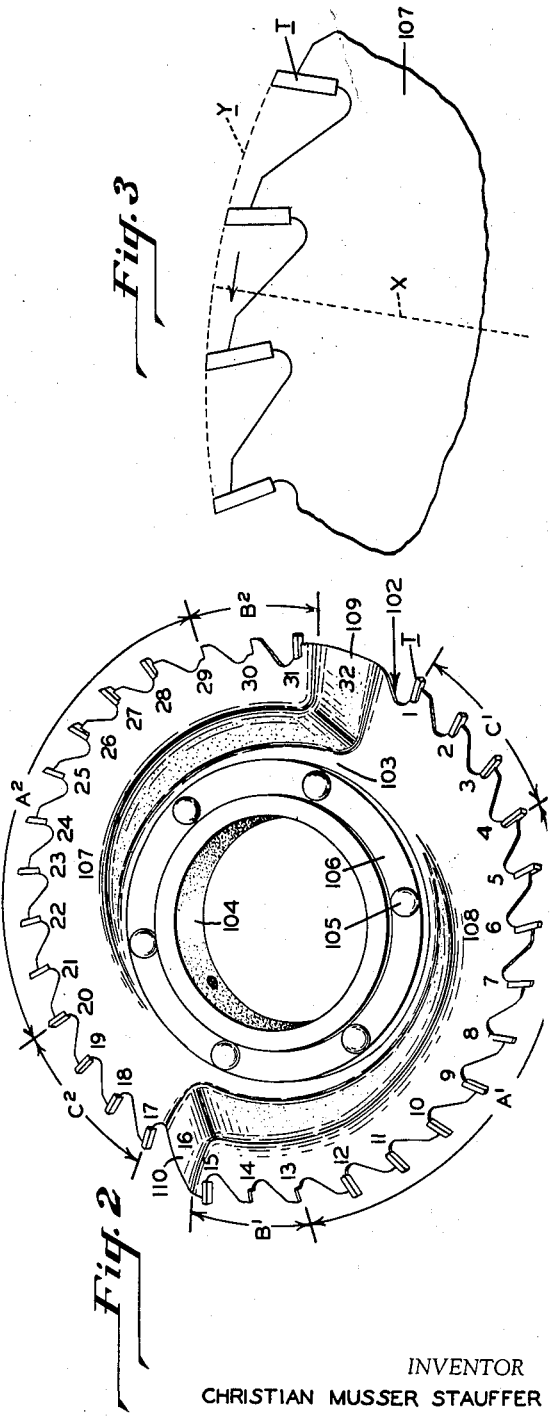
INVENTOR
CHRISTIAN MUSSER STAUFFER
by Walter J. Kaufman
ATTORNEY July 10, 1956 C. M. STAUFFER 2,753,901
PLANING CUTTER AND CUTTER-ARBOR ASSEMBLY
Filed Aug. 26, 1952 2 Sheets-Sheet 2
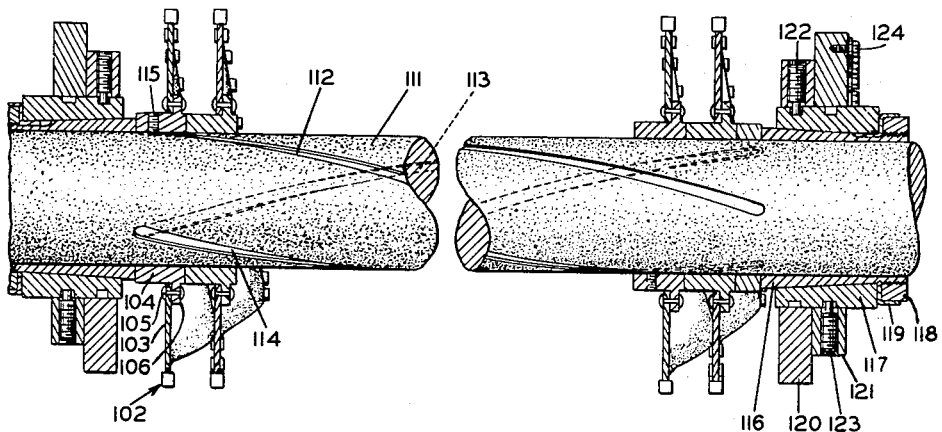
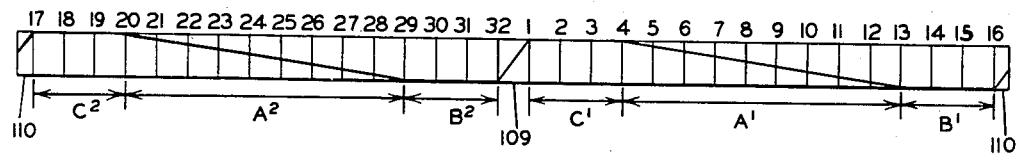
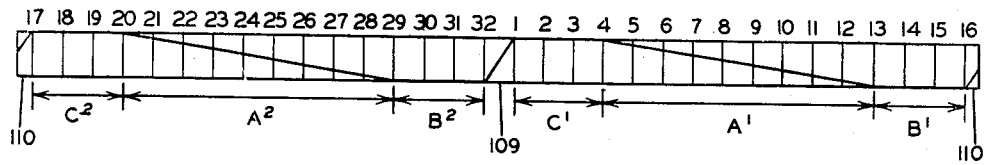
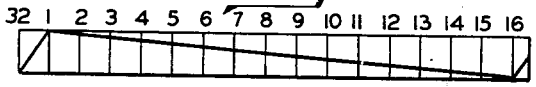
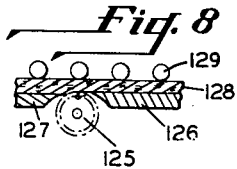
INVENTOR
CHRISTIAN MUSSER STAUFFER
by Walter J. Kaufman
ATTORNEY

United States Patent Office 2,753,901
Patented July 10, 1956

2,753,901

PLANING CUTTER AND CUTTER-ARBOR ASSEMBLY

Christian Musser Stauffer, East Hempfield, Pa., assignor to Armstrong Cork Company, Lancaster, Pa., a corporation of Pennsylvania Application August 26, 1952, Serial No. 306,457

9 Claims. (Cl. 144—221)

This invention relates to a planing cutter and to a cutter-arbor assembly and is concerned particularly with a cutter and cutter-arbor assembly useful in planing the surface of fiberboard sheets and the like. In the manufacture of many products from fiberboards it is desirable to provide smooth plane surfaces on the boards or on one flat surface thereof. Fiberboards are not structurally as strong or as rigid as natural wood, primarily because of their open porous nature, a desirable characteristic for many fiberboard uses, but this soft, yielding characteristic of fiberboards renders them difficut to plane or reduce to a desired thickness within relatively close limits. Fiberboards are, of course, manufactured to a specified thickness, but with the equipment employed in their fabrication the boards vary to a substantial degree above and below the mean thickness. For instance, a 1" fiberboard may vary as much as .040 of an inch in thickness. Attempts have been made to produce the desired surface on fiberboards and reduce them to a thickness within reasonably close limits by the use of conventional drum sanders; but on a mass production basis where many hundred thousands of board feet of fiberboard are to be surfaced, the drum sanders have not proven practical because the abrasive paper or cloth tends to become rapidly loaded with the fibers. Attempts have been made also to reduce the boards to the desired thickness and provide the requisite surface by various calendering operations, but this too has not been a satisfactory solution to the problem, for uniform surface finish and thickness control cannot be effected within the desired limits operating upon a relative soft and yielding fiberboard blank. The blank tends to expand after compression, and there is some tendency for the re-expansion to occur nonuniformly.

While the invention is particularly useful in connection with the fabrication of fiberboard materials, it is not limited thereto, since the invention is applicable for many different purposes and for operating upon many different types of material. The invention, for instance, may be useful in the fabrication of soft woods and, when suitably modified, may be useful in the surface treatment of hardwoods, plastic, so-called hard boards, and the like. While the cutter is essentially useful as a planing device, it will serve also as a dado cutter or a chipper. Other uses for the invention will be recognized by those skilled in the art.

An object of the invention is to provide a cutter which is so construced as to permit high-speed operation utilizing a relatively lightweight cutter body. Where the invention is used as a planing cutter and a plurality of the cutters are mounted upon an arbor for operation in unison as, for example, in planing of a surface of a fiberboard sheet 48" or more in width, the matter of weight is of important significance, particularly where high-speed operation is desired in order to obtain a smooth finish and accurate control of dimensions of the finished piece.

Another object of the invention is to provide a cutter with cutting teeth disposed as a multiple helix and to provide for mounting of the cutters in nested relationship with adjacent cutters similarly formed to provide for planing of a continuous surface throughout the extent of the axial length of the nested cutters, the cutters being so constructed as to eliminate the concentration of stresses in the helical portions thereof which might affect proper planing. In high-speed operation of a planing cutter, concentration of stresses in the helical portions is objectionable and is aggravated by the fact that substantial radial forces are generated through centrifugal motion with the cutter operating at relatively high speeds. The present invention overcomes this obstacle by a unique cutter body arrangement.

A further object of the invention is to provide a cutter which will not only plane a surface smoothly and accurately but will also burnish the surface as well. This may be accomplished with the cutter of the present invention by forming the cutter edge of the teeth in a unique manner.

An additional object of the invention is to provide a cutter-arbor assembly which is essentially free of longitudinal stresses. So-called wabble saws have been proposed and are sometimes used for rough surfacing products such as corkboard, mineral wool insulation board, and the like. Such cutters are generally arranged on an arbor and held in place by collars threaded onto the arbor, the collars serving to clamp the cutters there-between. This develops objectionable longitudinal stresses in the arbor which result in inaccurate surfacing when the cutters are operated at high speeds. Dynamic balancing of this type of device is quite difficult.

Another object of the invention is to provide a cutter-arbor assembly in which each of the cutters may be of essentially identical formation and thus may be replaced readily on the arbor when dull or damaged. This is particularly important in providing convenient and accurate assembly of properly offset cutters to provide a substantially continuous helical path for the cutting teeth, effective for planing a surface coextensive with the axial length of the assembled cutters on the arbor.

Another object of the invention is to provide a cutter-arbor assembly which will permit sharpening or resharpening of the cutters in multiple and in position on the arbor and mounted in the planing machine and rotating at operating speeds.

According to the present invention, a planing cutter is provided comprising a formed sheet metal member of disc shape having a body portion provided with a central opening therein, the body portion extending generally radially with respect to the axis of the disc. Cutter webs which are disposed as multiple helixes of the same pitch and hand are provided on the cutter and each sweeps essentially the same path. Each of the helixes starts substantially in the plane of the body portion of the cutter and sweeps axially therefrom, and each of the webs has a trailing portion which extends beyond the helix and lies in a plane substantially parallel to but offset from the plane of the body portion. There are connecting webs which join the cutter webs to the body and extend from the trailing end of one cutter web to the starting or leading end of the next adjacent cutter web. In addition to having the plane portions at the trailing end of the helical webs as mentioned above, similar plane portions may be provided at the leading end of each cutter web, as will be more fully hereinafter described.

The cutter-arbor assembly includes a plurality of cutters which have cutting teeth disposed at the periphery thereof in a plurality of over-lapping helical paths and means for securing the cutters to the arbor in nested position and with their cutting edges in helically offset relationship, one with respect to another, to sweep a path which extends from edge to edge of the assembled cutters.

The cutters are preferably provided with inserted "Carboloy" teeth which are ground on a radius corresponding to the radius of the cutter, thus providing for no clearance at the cutting edge and resulting in a burnishing action on the surface of the material being operated upon. The teeth are mounted on the cutter webs to provide an obtuse angle, preferably about 15°, at the cutting edge.

In order that the invention may be readily understood, an embodiment thereof will be described in conjunction with the attached drawings in which:

Figure 1 is a perspective view illustrating a cutter-arbor assembly mounted upon a grinding support;

Figure 2 is a perspective view of an individual cutter;

Figure 3 is a partial plan view of a cutter segment illustrating the cutting angle of the cutter teeth;

Figure 4 is a sectional view showing the mounting of the cutters on an arbor;

Figure 5 is a diagrammatic view illustrating the developed profile of a cutter of the present invention;

Figure 6 is a view similar to Figure 5 illustrating the developed profile of the cutter blank which is somewhat smaller than the developed profile of the cutter as shown in Figure 5;

Figure 7 is a view similar to Figures 5 and 6 of a modified cutter embodying the invention; and Figure 8 is a diagrammatic view illustrating the cutter-arbor assembly in a planing machine.

The cutters are shown in Figures 2 and 4 and each comprises a body blank 102 of generally disc shape having a central flat portion 103 which is provided with an opening which receives a hub 104, the hub being joined to the body blank 102 by rivets 105 which pass through a radial flange 106 of the hub and are burred over the body blank 102 at the central flat portion 103 as shown in Figure 4. The central flat portion 103 extends generally radially with respect to the axis of the cutter.

The body blank is formed with a pair of cutter webs 107 and 108 (Figure 2). Each of these webs is struck from the body portion to define a helical path as shown in Figure 1 and as diagrammed in Figure 6. Connecting webs 109 and 110 join the cutter webs 107 and 108 and the central flat portion 103. The cutter webs are formed with helixes of the same pitch and hand so that each sweeps substantially the same path. It is essential in the formation of the cutters to provide a portion of the trailing edge of each cutter web adjacent to the connecting web which is disposed in a plane substantially parallel to but offset from the central flat portion 103. As shown in Figure 2, the helically disposed portion of each of the cutter webs has been designated by the letter A and the plane portion by the letter B. Preferably there is also a corresponding plane portion at the leading edge of the cutter web, and this has been designated by the letter C in Figure 2.

Figure 6 which diagrammatically shows the developed profile of the cutter webs and connecting webs has been divided into thirty-two equal spaces. At spaces 1 to 4 the web is substantially plane, corresponding to portion C¹ of Figure 2. From spaces 4 to 13 the cutter web is disposed as a helix, corresponding to a portion A¹ of Figure 2. At spaces 13 to 16 there is another plane web portion, corresponding to a portion B¹ of Figure 2. From spaces 16 and 17 there is an inclined portion which corresponds to the connecting web 110 of Figure 2, and from spaces 17 to 32 there is a duplicate of the profile from spaces 1 to 16, corresponding to sections C², A², and B² of Figure 2.

By providing the plane portions of B¹ and B² on the trailing edges of the helical portion of each cutter web, it is possible to form the cutter member from sheet metal, although the cutters have a relatively large diameter and operate at a high speed. For instance, a cutter body 10¹¹⁄₁₆" in diameter may be formed from No. 10 gauge metal .1345" thick. Any concentration of metal stresses in the helical portions of the cutter webs is avoided with the cutter body of this invention. The provision of the plane portions which are disposed at the zone of the deepest draw, 1½" in this example at connecting webs 109 and 110, avoids any thinning of the metal which would occur were the helical portions of the cutting webs extended from one connecting web to the next. While in the illustrated embodiment these plane portions extend over an area equivalent to three tooth spaces, more or less extensive plane areas may be provided depending upon the thickness of the cutter member, the diameter of the cutter, the speed of cutter rotation, maximum depth of cut to be made, and other variable factors.

Preferably the cutter webs are machined to receive "Carboloy" teeth T which are brazed or welded thereto. The teeth in the illustrated embodiment may be ⅛" thick, ¼" wide, and ½" long. Such teeth are required only on the helical portions of the cutter webs, but if desired may be provided on the plane portions B and C and so positioned thereon as to define a helical path as a continuation of the helical portion A. Figure 5 which illustrates the developed profile of a cutter at the cutting edge of the teeth (it will be noted that it is slightly larger than the developed profile of the blank, Figure 6) shows that the teeth at spaces 4 to 13 sweep the entire axial length of the cutter and that the teeth at spaces 20 to 29 sweep the same path. In the cutter shown in the drawing the teeth are disposed as a double helix with a 1½" pitch and a 3" lead. Teeth provided at spaces 1 to 4, and 17 to 20 which are in the plane portions C of the cutter web all sweep an identical path. The same is true of teeth provided at spaces 13 to 16 and 29 to 32 which are in the plane portions B of the cutter web; they sweep an identical path. There is no disadvantage in having duplicate teeth in such areas, particularly with a high feed rate for the sheet being operated upon. However, as shown in Figure 2, some of the teeth may be inserted while others may be omitted in the plane portions. For proper balancing the cutter, diametrically opposite teeth should always be omitted.

Figure 7 illustrates the developed profile of one of the two identical halves of a cutter having a body of essentially the same profile as the cutter body of Figure 6 but with the cutter teeth T disposed in a helical path throughout, this profile being obtained by axially offsetting the teeth in the plane portions B and C of the cutter in a helical path having the same helix angle as the teeth in the portions A.

The present invention also contemplates a novel cutter assembly shown in Figures 1 and 4. It includes an arbor 111 which is essentially cylindrical throughout its body portion and is provided with one or more helically disposed indexing grooves, flats, or their equivalent to receive fastening devices for securing each of the individual cutters separately to the arbor. In Figure 4 there are shown three equally spaced helical grooves having essentially flat lands 112, 113, and 114, with projecting side walls as shown in Figure 4 provided on the arbor body. The lead of the helix of each of the grooves is 48", and the pitch of the three grooves is 16".

The lead of the indexing means (the flat surfaces 112, 113, and 114 in Figure 4) should be equal to $n$ times the pitch of the helix of the cutter teeth, where $n$ is the number of tooth spaces on the cutter. In the cutter illustrated in Figure 2, the pitch is 1½" and the number of tooth spaces is 32, thus the lead of the indexing groove is 48". This provides for the indexing of the cutters with the helical path swept by one cutter merging into the helical path of its adjacent cutter or cutters. Three helical grooves have been shown in Figure 4 to provide multiple securement for each cutter. It will be understood that a single helical groove or any number of grooves may be provided. Spaced holes disposed in a helical path may be provided along the arbor to receive the set screws; or, as mentioned above, the arbor may be machined to provide a flat helical land or lands against which the fasteners for the cutters may be pressed to secure the cutters to the arbor in a fixed helically offset position. Each of the cutters is identical in pitch and each is provided with fastening means such as set screws 115 spaced 120° from each other and adapted to be received within the helical grooves 112—114. The hubs 104 are so dimensioned that when positioned as shown in Figure 4 with the set screws 115 received within the appropriate grooves 112—114 in the arbor there will be a continuation of the path swept by the helically disposed teeth of one cutter into the path swept by the teeth of the next adjacent cutter; and since each cutter has two sets of helically disposed teeth, each sweeping essentially the same path, there will be a continuous path swept by two sets of teeth extending throughout the axial length of all of the cutters mounted on the arbor. This arbor-mounting arrangement has the advantages of providing rapid and accurate assembly, of permitting the fabrication of identical cutters for all positions along the length of the mandrel, facilitating replacement of damaged or dulled individual cutters, and of eliminating the development of objectionable longitudinal stresses in the arbor as encountered in assembly arrangements where the cutters are clamped in position on the arbor between collars threaded onto the arbor.

Generally conventional dynamic balancing members are provided on the arbor, and dynamic balancing is effected in the usual manner. As shown in Figure 4 the balancing arrangement at each end of the arbor includes a slitted tapered cone sleeve 116 frictionally secured to arbor 111. A tapered mounting ring 117 is received over the sleeve 116, and the members 116 and 117 are fixed in position by nut 118 threaded onto sleeve 116 and locked in position by a conventional split locking ring 119. The mounting ring 117 carries a pair of eccentric balancing weights 120 and 121 which are secured in adjusted position on the mounting ring 117 by set screws 122 and 123 received within annular guiding grooves in the mounting ring. To provide for a vernier adjustment of the balancing weight 121 a series of holes are drilled and tapped therein, and cap screws 124 may be inserted as necessary to obtain final balancing.

In operating upon fiberboard, the cutter may be mounted in a device which has been diagrammatically illustrated in Figure 8. The cutter indicated by the numeral 125 is mounted in suitable bearings and is driven by a motor, not shown. The cutter, for example, may be rotated at 3600 revolutions per minute. Suitable supporting guides 126 and 127 may be disposed to support the sheet of fiberboard 128 to be planed and a cut of the desired depth may be made, $\frac{1}{16}''$ for example. Rolls 129 are provided for driving the piece through the machine at a rate of 30–120 feet per minute, for instance.

With fiberboard, it is preferred to lightly burnish the planed surface, and this may be accomplished by employing the cutters of the present invention with a novel cutting edge illustrated in Figure 3. This cutting edge is obtained by grinding the teeth T with a radius of curvature X equal to the radius of the cutter to provide an arcuate surface in the circumference of the cutter indicated by the letter Y in Figure 3. It will be noted that an obtuse angle is formed at the cutting edge of the teeth, with a rake angle of about 15° being preferred. This may be accomplished by mounting the cutters on the arbor as shown in Figure 1 and positioning the arbor in bearings mounted on a grinding stand. The arbor is then rotated at about 2000 revolutions per minute, and a rotating grinding wheel is traversed back and forth with respect to the rotating cutters. Rough grinding to approximately the desired diameter is thus obtained. Final grinding is preferably effected by positioning the arbor in the planing machine and rotating it at final operating speed, 3600 revolutions per minute, and traversing a rotating grinding wheel over the rotating cutters. When operating large cutters at high speed there is a substantial radial thrust developed through centrifugal action, and distortion of the cutter body results, particularly adjacent to the connecting webs 109 and 110. By grinding the teeth T while the cutter arbor is rotating at its normal operating speed, a truly cylindrical cutting surface will be developed.

I claim:

1. A cutter comprising a formed metal member of disc shape having a body portion provided with a central opening therein, said body portion extending generally radially with respect to the axis of said disc, cutter webs disposed as multiple helixes of the same pitch and hand and each sweeping essentially the same path, each helix starting substantially in the plane of said body portion and sweeping axially therefrom, each of said cutter webs having a trailing portion thereof which extends beyond said helix in the direction of rotation of said cutter in operation lying in a plane substantially parallel to but offset from the plane of said body portion, connecting webs joining said cutter webs and extending from the trailing end of one cutter web to the leading end of the next adjacent cutter web, and cutter teeth mounted on said cutter webs.

2. A cutter comprising a formed metal member of disc shape having a body portion provided with a central opening therein, said body portion extending generally radially with respect to the axis of said disc, cutter webs disposed as multiple helixes of the same pitch and hand and each sweeping essentially the same path, each helix starting substantially in the plane of said body portion and sweeping axially therefrom, each of said cutter webs having a leading portion and a trailing portion thereof which extend from said helical portion and lie in planes substantially parallel to the plane of said body portion, the plane portion at the trailing edge being offset from said body portion and at the leading edge being substantially in the plane of said body portion, connecting webs joining said cutter webs and extending from the trailing portion of one cutter web to the leading portion of the next adjacent cutter web, and cutter teeth mounted on said cutter webs and disposed in helical paths, with the teeth on one web sweeping essentially the same path as the teeth on another web.

3. A cutter comprising a formed metal member of disc shape having a body portion provided with a central opening therein, said body portion extending generally radially with respect to the axis of said disc, cutter webs disposed as multiple helixes of the same pitch and hand and each sweeping essentially the same path, each helix starting substantially in the plane of said body portion and sweeping axially therefrom, each of said cutter webs having a leading portion and a trailing portion thereof which extend from said helical portion and lie in planes substantially parallel to the plane of said body portion, the plane portion at the trailing edge being offset from said body portion and at the leading edge being substantially in the plane of said body portion, connecting webs joining said cutter webs and extending from the trailing portion of one cutter web to the leading portion of the next adjacent cutter web, and cutter teeth mounted on said cutter webs and disposed in helical paths starting at the leading edge of one cutter web and extending helically throughout the helical portion of said cutter web and the plane portions thereof and terminating adjacent to said connecting web.

4. In a machine of the class described, the combination of an arbor, a plurality of cutters mounted on said arbor, each of said cutters having a plurality of cutting teeth disposed at the periphery thereof in a plurality of helical paths of the same pitch and hand, adjacent cutters having cutting teeth disposed in helical paths of the same pitch and hand, means mounted on said cutters for securing said cutters individually to said arbor, and indexing means on said arbor cooperating with said securing means on said cutters for positioning the individual cutters on the arbor with their helically disposed cutting teeth lying in continuous helical paths extending from cutter to cutter.

5. In a machine of the class described, the combination of an arbor, a plurality of cutters mounted on said arbor, each of said cutters having a plurality of cutting teeth disposed at the periphery thereof in a plurality of helical paths of the same pitch and hand, adjacent cutters having cutting teeth disposed in helical paths of the same pitch and hand, means mounted on said cutters for securing said cutters individually to said arbor, and helically disposed indexing means on said arbor cooperating with said securing means on said cutters, the lead of said helically disposed indexing means being equal to $n$ times the pitch of the helix of the teeth of the cutters where $n$ equals the number of tooth spaces provided on the periphery of each cutter.

6. In a machine of the class described, the combination of a substantially cylindrical arbor, a plurality of cutters having hubs with substantially cylindrical bores mounted on said arbor, each of said cutters having a plurality of cutting teeth disposed at the periphery thereof in two helical paths of the same pitch and hand, adjacent cutters having their cutting teeth disposed in helical paths of the same pitch and hand, means received within the hubs of said cutters for securing said cutters individually to said arbor, and indexing means on said arbor cooperating with said securing means for positioning the individual cutters on the arbor with their helically disposed cutting teeth lying in continuous helical paths extending from cutter to cutter.

7. In a machine of the class described, the combination of a substantially cylindrical arbor, a plurality of cutters having hubs with substantially cylindrical bores mounted on said arbor, each of said cutters having a plurality of cutting teeth disposed at the periphery thereof in two helical paths of the same pitch and hand, means received within the hubs of said cutters in the same radial position in each cutter for securing said cutters individually to said arbor, and indexing means on said arbor cooperating with said securing means for positioning the individual cutters on the arbor with their helically disposed cutting teeth lying in continuous helical paths extending from cutter to cutter, said indexing means comprising a helically disposed, substantially flat surface on said arbor against which said securing means are pressed.

8. In a machine of the class described, the combination of an arbor, a plurality of cutters individually mounted on said arbor, each of said cutters having a plurality of cutting teeth disposed at the periphery thereof in two helical paths of the same pitch and hand, each cutter having a hub received over said arbor, means received within each hub in essentially the same radial relationship to said helically disposed cutting teeth for securing said individual cutters to said arbor in any desired position along the axis thereof, and indexing means on said arbor comprising a helically disposed land with upstanding side walls, the lead of said land being equal to $n$ times the pitch of the helix of the teeth of the cutters where $n$ equals the number of tooth spaces provided on the periphery of each cutter, cooperating with said securing means for positioning each individual cutter on the arbor with their helically disposed cutting teeth lying in continuous helical paths extending from cutter to cutter.

9. In a machine of the class described, the combination of claim 8 in which said cutting teeth each has a cutting edge defined by a surface lying in the circumference of said cutters with the axis of said arbor as the center thereof, said surface extending throughout substantially the whole of the circumferential length of the tooth, and an intersecting surface extending at an obtuse angle with respect to said first mentioned surface.

References Cited in the file of this patent

UNITED STATES PATENTS

| Number | Name | Date |
|---|---|---|
| 262,698 | Sawyer et al. | Aug. 15, 1882 |
| 346,681 | Perry | Aug. 3, 1886 |
| 381,799 | Lamson | Apr. 24, 1888 |
| 447,716 | Fox | Mar. 3, 1891 |
| 717,719 | Schmidt | Jan. 6, 1903 |
| 1,282,285 | Plank | Oct. 22, 1918 |
| 1,533,547 | Hathaway | Apr. 14, 1925 |
| 1,595,924 | Rabidou | Aug. 10, 1926 |
| 2,349,949 | Farrell | May 30, 1944 |
| 2,600,272 | Segal | June 10, 1952 |
| 2,657,720 | Wolfe | Nov. 3, 1953 |